United States Patent
Divakaran et al.

(10) Patent No.: US 7,327,885 B2
(45) Date of Patent: Feb. 5, 2008

(54) METHOD FOR DETECTING SHORT TERM UNUSUAL EVENTS IN VIDEOS

(75) Inventors: Ajay Divakaran, Burlington, MA (US); Ziyou Xiong, Urbana, IL (US); Regunathan Radhakrishnan, Arlington, MA (US); Kadir A. Peker, Winchester, MA (US); Koji Miyahara, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1017 days.

(21) Appl. No.: 10/610,467

(22) Filed: Jun. 30, 2003

(65) Prior Publication Data

US 2004/0268380 A1    Dec. 30, 2004

(51) Int. Cl.
*G06K 9/46* (2006.01)
*H04H 9/00* (2006.01)
*H04N 7/18* (2006.01)

(52) U.S. Cl. .................. 382/190; 725/19; 348/143
(58) Field of Classification Search ................ 382/190; 348/143; 725/37–60, 19
See application file for complete search history.

(56) References Cited

U.S. PATENT DOCUMENTS

| | | | | |
|---|---|---|---|---|
| 3,919,479 A * | 11/1975 | Moon et al. | ................ | 704/237 |
| 5,692,093 A * | 11/1997 | Iggulden et al. | .............. | 386/46 |
| 5,870,151 A * | 2/1999 | Korber | ....................... | 348/553 |
| 5,999,689 A * | 12/1999 | Iggulden | ...................... | 386/46 |
| 6,469,749 B1 * | 10/2002 | Dimitrova et al. | .......... | 348/722 |
| 6,496,228 B1 * | 12/2002 | McGee et al. | ............. | 348/700 |
| 6,577,346 B1 * | 6/2003 | Perlman | ..................... | 348/460 |
| 6,731,788 B1 * | 5/2004 | Agnihotri et al. | .......... | 382/157 |
| 6,865,226 B2 * | 3/2005 | Xie et al. | ............. | 375/240.08 |
| 6,870,956 B2 * | 3/2005 | Qi et al. | ..................... | 382/170 |
| 7,064,796 B2 * | 6/2006 | Roy et al. | .................... | 348/700 |
| 7,120,351 B2 * | 10/2006 | Engle et al. | .................. | 386/35 |
| 7,164,798 B2 * | 1/2007 | Hua et al. | ................... | 382/229 |
| 7,170,566 B2 * | 1/2007 | McGee et al. | ............. | 348/722 |
| 7,209,631 B2 * | 4/2007 | Tada et al. | .................... | 386/46 |
| 2004/0125877 A1 * | 7/2004 | Chang et al. | .......... | 375/240.28 |
| 2004/0190853 A1 * | 9/2004 | Dow et al. | .................... | 386/46 |

* cited by examiner

*Primary Examiner*—Aaron W Carter
(74) *Attorney, Agent, or Firm*—Dirk Brinkman; Clifton D. Mueller; Gene V. Vinokur

(57) ABSTRACT

A method detects short term, unusual events in a video. First, features are extracted features from the audio and the video portions of the video. Segments of the video are labeled according to the features. A global sliding window is applied to the labeled segments to determine global characteristics over time, while a local sliding window is applied only to the labeled segments of the global sliding window to determine local characteristic over time. The local window is substantially shorter in time than the global window. A distance between the global and local characteristic is measured to determine occurrences of the unusual short time events.

8 Claims, 3 Drawing Sheets

METHOD FOR DETECTING SHORT TERM UNUSUAL EVENTS IN VIDEOS

FIELD OF THE INVENTION

This invention relates to analyzing videos, and more particularly to detecting short portions of videos that are inconsistent with longer portions.

BACKGROUND OF THE INVENTION

Detecting short term, unusual events in a video is useful for many applications. For example, if the events are commercial segments of a broadcast video, then the user can rapidly skip over those segments to provide continuity of the underlying program. If the video is of a sporting event, for example football or golf, then highlights such as goals and puts can be detected rapidly. In a surveillance video, an intruders and traffic accidents are unusual events. Thus, unusual event detection is the foundation for video editing, summarization, indexing and browsing, and many other video processing applications.

Prior art event detection methods have mainly relied on identifying rules that measure attributes that are common to unusual or interesting events, such as black frames before the onset of a commercial, a large number of scene cuts, a high level of activity, perhaps combined with a louder or unusual audio track. Black frames can be detected by measuring the mean and variance of pixel intensities in frames. The high level of activity can be measured in terms of edge change ratio and motion vector length. Other rules consider the amount, size, style, and placement of text in a frame.

However, such rule based approaches assume a preconceived notion of the content, which is not supported by all videos, in general. For example, the rule for detecting commercials will fail for other short term events, such as scoring opportunities in a sport videos. The scene cut rule will fail for climatic scenes in action movies. The black frame rule is strictly dependent on a production style, which is not universally followed. Thus, rule based methods are unreliable in the general case.

Therefore, there is a need for a general data driven method that can detect short term, unusual events, independent of rules or content. Furthermore, it is desired that this method operates in the compressed domain.

SUMMARY OF THE INVENTION

A method detects short term, unusual events in a video. First, features are extracted features from the audio and the video portions of the video. The features can be analyzed statistically to produce labels so that segments of the video are labeled according to the features.

A long global sliding window is applied to the labeled segments to determine global characteristics over time, while, at the same time, a short local sliding window is applied only to the labeled segments of the global sliding window to determine local characteristics. An interactive display system includes a sensor for sensing a relationship between a first coordinate frame fixed to a moving projector, and a second coordinate frame fixed to a stationary display surface in the real world. An output image to be projected on the display surface is partitioned into a black image portion having a fixed relationship to the first coordinate frame, a stable image portion within the block image portion having a fixed relationship to the second coordinate frame, and a mobile image portion within the stable image portion having a fixed relationship to the first coordinate frame. The mobile portion can be used as a pointer within the stable portion.

The local window is substantially shorter in time than the global window. A distance between the global and local characteristic is measured to determine occurrences of the unusual short time events.

Note that the size of both windows can be adaptively chosen using a multi-resolution analysis of the statistical characteristics of the video. For instance, the size of the windows can increase in step sizes, and variations in the characteristics from window to window can be measured. A minimum size for which the aforementioned variation is negligible, is a good choice for the global window because it shows no influence of the unusual event and is thus a good model of the usual event. The local window can sized accordingly.

DETAILED DESCRIPTION OF THE PREFERRED EMBODIMENT

Figure 1:
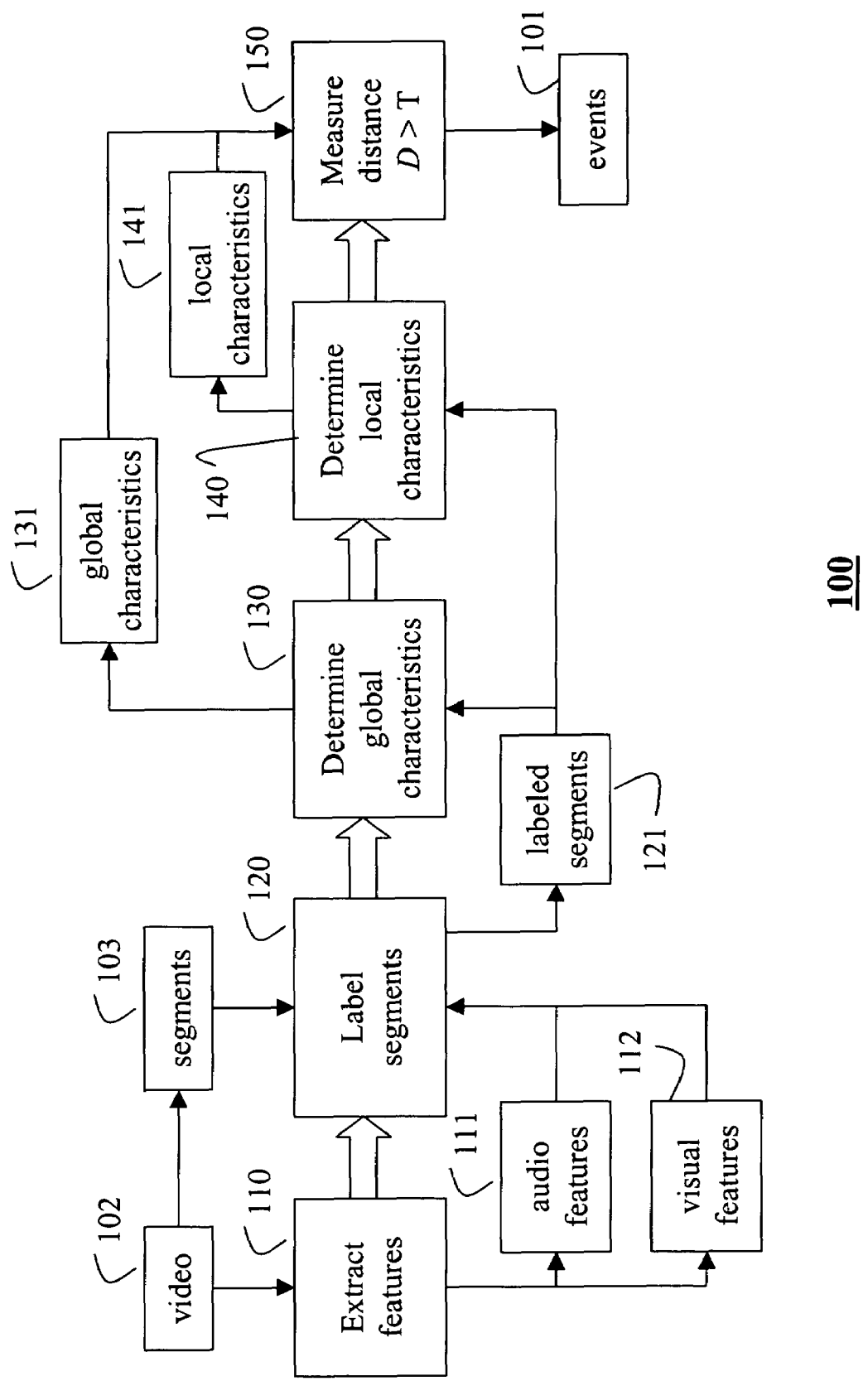
FIG. 1 is a block diagram of an event detection method according to the invention.

As shown in FIG. 1, our invention provides a method 100 for detecting short term, unusual events 101 in a video 102. The video can be uncompressed or compressed. The method first extracts 110 audio features 111 and visual features 112 from the video. The features are used to label 120 segments 103 of the video producing labeled segments 121. Two sliding windows are then applied to the video. A first 'global' window covers a longer time interval, and a second 'local' window covers a short time interval within the longer interval. Global characteristics 131 are determined 130 for the sliding global window, while local characteristics 141 are concurrently determined 140 for the local window sliding only within the global window. A distance is measured 150 between the global and local characteristics. If this distance D is greater than a predetermined threshold T at a particular point in time, then the local window is identified with a short term, unusual event 101 in the video 102.

Figure 2:
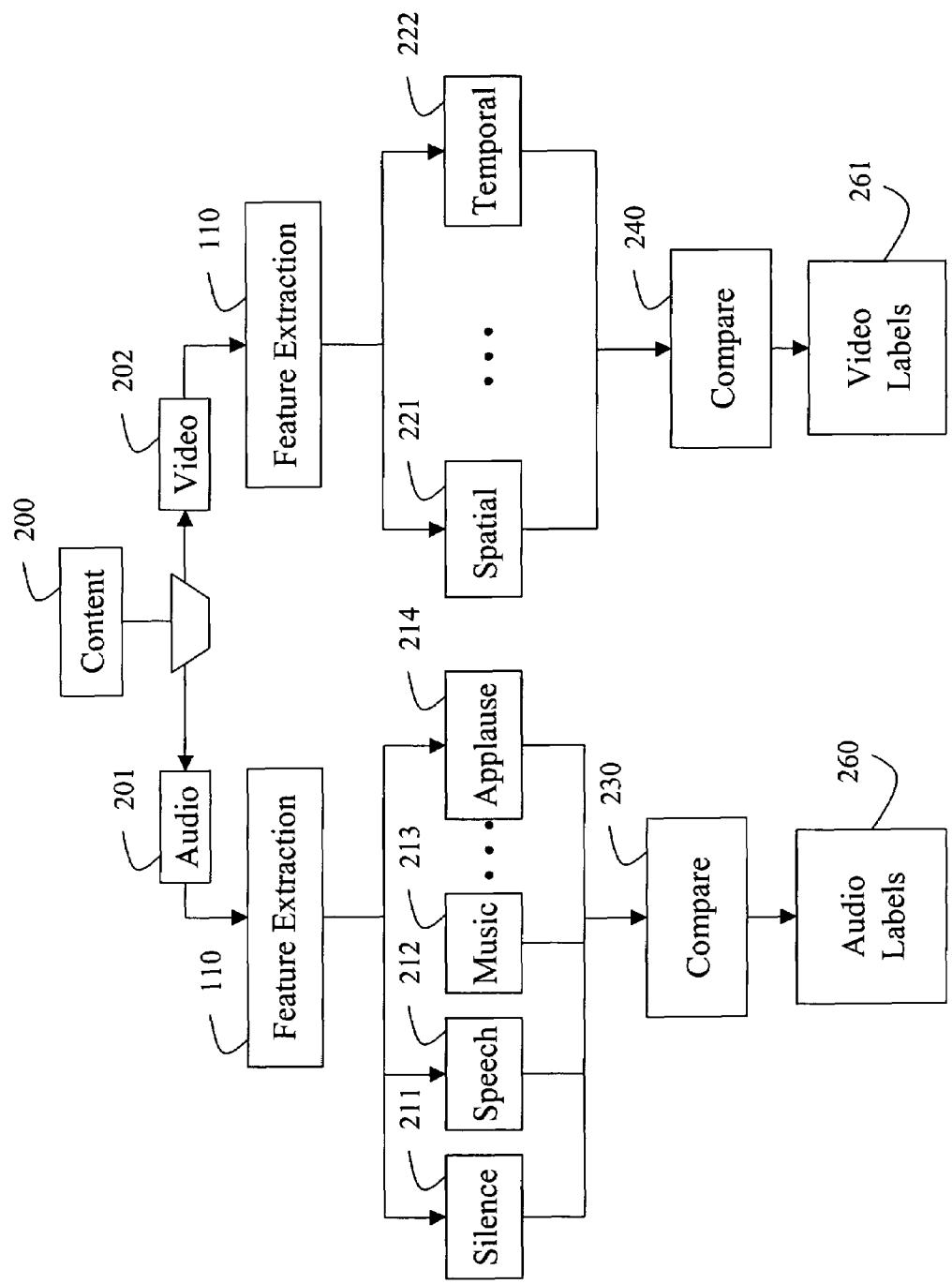
FIG. 2 is a block diagram of video labeling according to the invention.

As shown in FIG. 2, the content 200 of the video 101 is first demultiplexed into an audio portion 201 and a visual portion 202. The audio portion is partitioned into, e.g., 0.5 second frames, and audio features are extracted 110 every 30 ms with a 10 ms overlap. The audio features 111 can include low level features such as pitch, amplitude, Mel frequency cepstral coefficients (MFCC), medium level features such as speech and music, and high level features such as music genre, artist, song title, speech content. A distribution of these features, e.g., a Gaussian mixture model (GMM) can be used to further classify the audio frames into different classes, e.g., silence 211, speech 212, music 213, applause 214, etc., and various combinations thereof, for details see U.S. Pat. No. 6,321,200 issued to Casey on Nov. 20, 2001, "Method for extracting features from a mixture of signals," incorporated herein by reference. The classes are compared 230 to determine visual labels 260 using a maximum likelihood score. It should be understand that other statistical means and classification processes can be used to convert the features of the video content to labels.

The visual features 112 can be extracted 110 from individual frames or multiple frames. Generally, the visual features include spatial 221 and temporal 222 features. Low level features can include color, motion, texture, etc. Medium and high level features can include MPEG-7 descriptors, if the video is compressed. The MPEG-7 intensity of motion activity descriptor, every 1.3 second and quantized to 5 levels, captures an intuitive notion of 'intensity of action' or 'pace of action' in a video segment and can be extracted from motion vectors of each P-frame. Because the visual labels are extracted for a shorter time duration (0.5 second), the visual labels are repeated for at least two audio frames to achieve synchronization between the audio and visual labels.

As stated above, short term, unusual events tend to be different from the rest of the video, perhaps to draw or need attention. A viewer watching the program perceives this as a context switch. Therefore, the method according to the invention detects unusual events by comparing the distribution of local and global characteristics in a particular context. The statistic used is for the distribution are the audio and visual labels.

Figure 3:
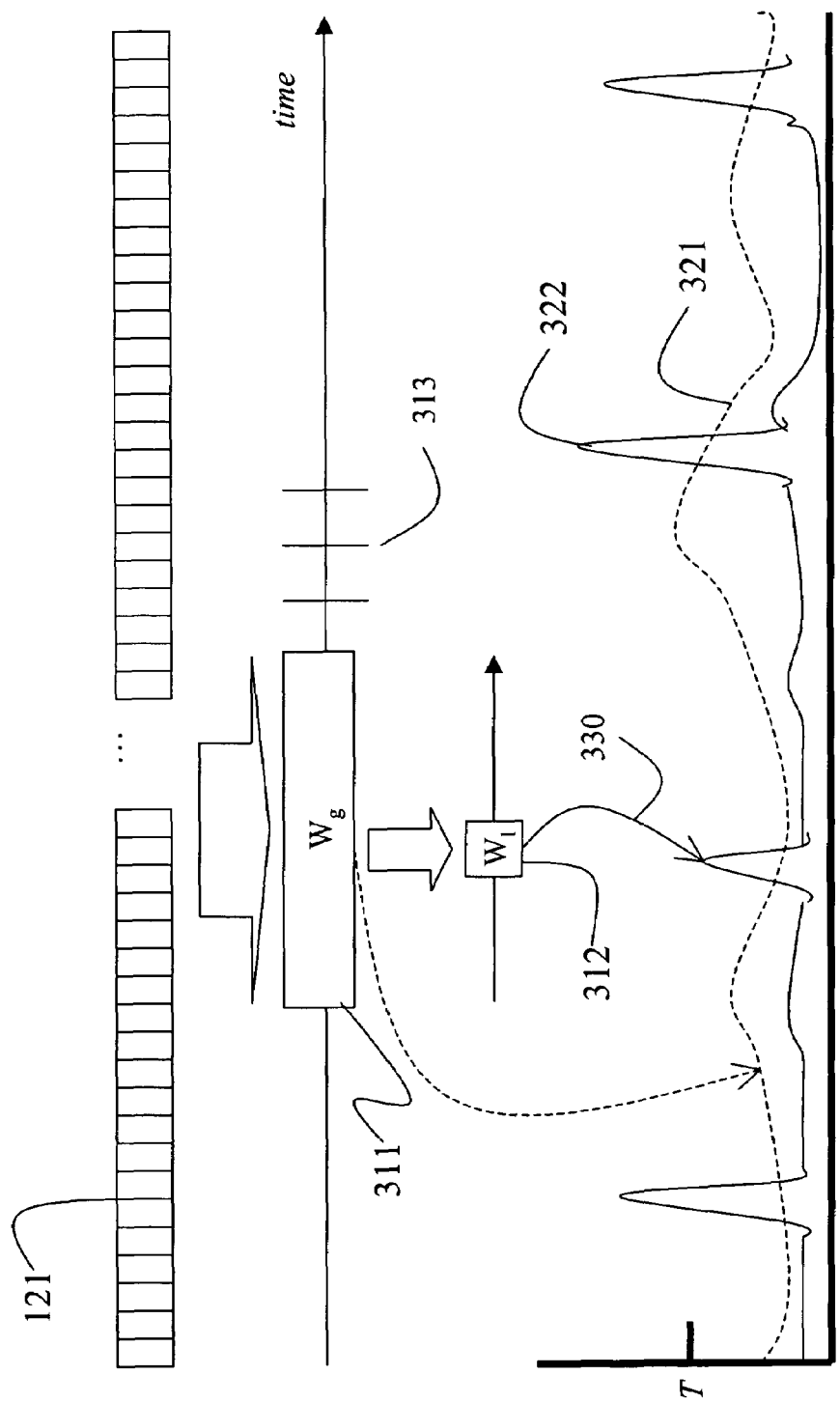
FIG. 3 is a block diagram of video characterization and event detection according to the invention.

FIG. 3 shows how long term characteristic 321 and short term characteristics 322 in a video 301 are determined with two temporal sliding windows. The method uses a relatively long global window ($W_g$) 311, e.g., a ten minute time interval, and a much shorter local window ($W_l$) 311, e.g., a time interval of a minute or less. That is, the time spans of the two windows differ substantially in length, e.g., five or ten times longer.

The basic assumption is that short term, unusual events are rare, and that they have different 'local' audio and video characteristics 322 over time, when compared to the more usual or global characteristics 321 for a given content. Here, the context is the time intervals associated with the windows 311-312.

In order to quantify the characteristics 322, i.e., what is considered as "usual" in a given context, we determine a distribution of the labels 260-261 within the context. Then, we do the same for the shorter window 312 within the longer window. The local characteristics can then be compared with the global characteristics using a distance metric, e.g., an information theoretic measure such as relative entropy, or a histogram distance metric, or any other suitable distance metric. One would expect a large distance value for a local window with a different distribution compared to what is "usual" within the global window.

Therefore, we 'slide' the long window forward over the labeled video segments 121 in step sizes 313 equal to the length of the short window 312 and determine a set of relative distance value $\{W_g\}>>\{W_l\}$, and select a maximum 330 of these set of values to associated with the local window 312 to represent the local characteristics. Then, the distinctive events are at times when there is a local maximum in the curve 322 that is greater than the predetermined threshold T.

For instance, in a news program, the onset of commercials typically cause a distribution of visual labels to peak around music and speech-with-music, whereas the global distribution in the current context, would peak around speech label. Therefore, a comparison of the local and global distribution of labels would signal the occurrence of something "unusual" in that context.

Note, unlike prior art commercial and highlight detection, the method according to the invention is content adaptive and does not rely on rules, such as the occurrence of mono-chrome frames, appearance of text etc.

The method defines what is 'usual' within a given context, and then measures deviations from the usual in an adaptive way. Also, the method works with features extracted in the compressed domain.

It should be noted, that the size of the global and local window can be learned adaptively by using a multi-resolution analysis of the statistical characteristics of the video.

For instance, the size of the windows can increase in predetermined step sizes, and variations in the characteristics from window to window can be measured.

A minimum size for which the aforementioned variation is negligible, is a good choice for the global window because it shows no influence of the unusual event and is thus a good model of the usual event. The local window can sized accordingly.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for detecting short term, unusual events in a video, comprising the steps of:
    extracting features from the video;
    labeling segments of the video according to the features;
    applying a global sliding window to the labeled segments to determine global characteristics over time, while applying a local sliding window to only the labeled segments of the global sliding window to determine local characteristic over time, wherein the local window is substantially shorter in time than the global window and the local sliding window is within the global sliding window; and
    measuring a distance between the global and local characteristic to determine occurrences of the unusual short time events.

2. The method of claim 1, further comprising:
    performing all steps on a compressed video.

3. The method of claim 1, further comprising:
    partitioning the video into an audio portion and a visual portion; and
    performing the extracting and labeling, in parallel, on the audio portion and the visual portion to determine audio features and visual features, and audio and visual labels.

4. The method of claim 3, in which the audio labels and the visual labels are synchronized in time.

5. The method of claim 1, in which the features include low, medium, and high level features.

6. The method of claim 1, further comprising:
    converting the features to labels by statistical means.

7. The method of claim 1, in which the global window is at least five times longer in time than the local window.

8. The method of claim 1, in which a size of the global window and a size of the local window is learned adaptively from a content of the video.

* * * * *